July 29, 1969  L. L. WRIGHT  3,458,644
CAST SOLID ELECTRICAL BUSHINGS HAVING STRANDED CONDUCTORS
Filed Nov. 30, 1967

WITNESSES:
Helen M. Farkas
James F. Young

INVENTOR
Leonard L. Wright
BY
Donald R. Lackey
ATTORNEY

United States Patent Office 3,458,644
Patented July 29, 1969

3,458,644
CAST SOLID ELECTRICAL BUSHINGS HAVING STRANDED CONDUCTORS
Leonard L. Wright, Sharon, Pa., assignor to Westinghouse Electric Corporation, Pittsburgh, Pa., a corporation of Pennsylvania
Filed Nov. 30, 1967, Ser. No. 686,990
Int. Cl. H02g 15/20; H01b 17/26
U.S. Cl. 174—23                                    8 Claims

ABSTRACT OF THE DISCLOSURE

A cast electrical insulating bushing for encased electrical apparatus of the type containing a fluid dielectric. The electrical bushing has an insulated stranded electrical conductor cast therein. The insulation is removed from at least a portion of the conductor which is embedded within the cast body portion of the bushing, and the strands of the conductor are separated to allow the casting material to completely surround the individual conductive strands of the electrical conductor, and prevent the pressure siphoning of the fluid dielectric from the casing.

BACKGROUND OF THE INVENTION

Field of the invention

The invention relates in general to encased electrical apparatus of the type having a dielectric fluid disposed therein, and more particularly to cast electrical bushings for such apparatus.

Description of the prior art

A stranded electrical cable inserted through a porcelain insulator and cemented in place within the insulator would provide a low cost electrical bushing. This structure, however, would be unsuitable for use with encased electrical apparatus of the type having a fluid dielectric disposed therein, such as an electrical distribution transformer containing insulating and cooling oil, as the fluid would be siphoned out of the apparatus through the cable strands when the apparatus is thermally cycled and the pressure increases within the tank or enclosure. With the development of the synthetic resins, electrical bushings have been constructed by casting a suitable resin structure about a conductor stud. To prevent pressure siphoning, the conductor stud in prior art structures is either solid, or contains a solid section. In some applications, such as the secondary bushings of electrical distribution transformers, it would simplify the manufacture of the electric apparatus and/or the installation of the electrical apparatus, if the electrical conductor which is disposed through the bushing were flexible and long enough to reach its intended connection points, thus eliminating the necessity of connecting additional cables to the ends of the bushing conductor. This rules out a completely solid conductor stud and necessitates the additional manufacturing time and cost associated with fabricating a specially designed solid connecting piece, and the subsequent connection of the two cables to this connector. Thus, it would be desirable to be able to utilize a single stranded cable for the bushing conductor, if this could be economically accomplished without the siphoning effect; or, to connect two stranded cables within the body portion of an electrical bushing without requiring a solid connecting piece, also without the siphoning effect.

SUMMARY OF THE INVENTION

Briefly, the present invention comprises an electrical bushing having a body portion formed of a cast solid resin insulation system. The cast body portion has flexible conductor means embedded therein, which extends outwardly from the ends of the bushing. In one embodiment of the invention, the flexible conductor means is a single, insulated, stranded flexible cable which has the insulation removed from at least a portion of the cable which is embedded in the cast body portion of the bushing. The cast resin system, while fluid, flows about each individual strand of the cable. The subsequent solidification and curing of the resin about the individual strands, at a common axial location, effectively seals the cable and prevents the flow of fluid therethrough.

In another eembodiment of the invention, the cable strands are slightly separated from one another at a point which is free from the cable insulation, and which is located within the body portion of the bushing. A slight reverse twist of the cable, prior to its unification with the cast resin system, by turning forces applied on each side of the portion of the cable which is to have its strands separated, will provide the necessary space between the strands.

In still another embodiment of the invention, the insulation is removed adjacent the end of a stranded cable, and the exposed strands are given a reverse twist to separate and expand them. The flared strands are then brazed, soldered, or otherwise permanently electrically connected to the strands at the end of a second stranded cable. The connection between the two cables is disposed within the bushing mold, and the cast resin system surrounds each of the separated strands at the end of the first stranded cable, to provide a seal within the bushing structure which prevents pressure siphoning.

Brief description of the drawing

Further advantages and uses of the invention will become more apparent when considered in view of the following detailed description and drawing, in which.

DESCRIPTION OF PREFERRED EMBODIMENTS

Figure 1:
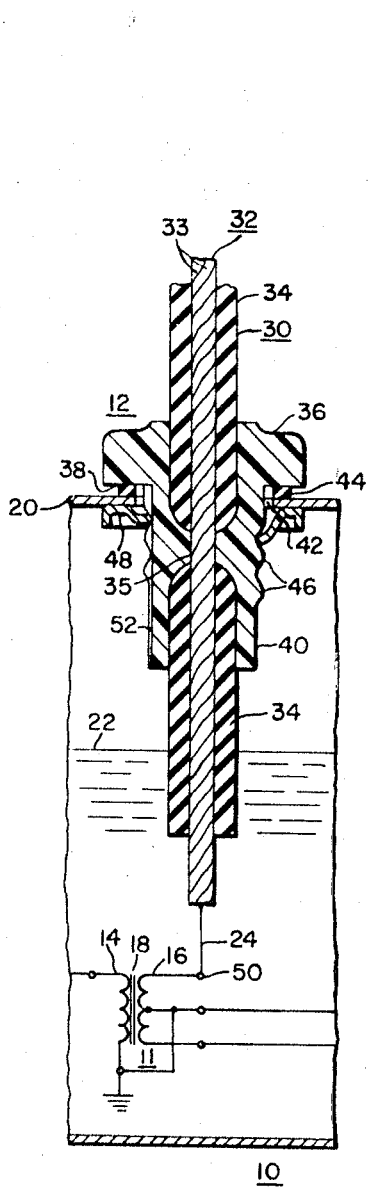
FIGURE 1 is a fragmentary, elevational view, partially in section and partially schematic, of encased electrical apparatus having an electrical bushing constructed according to an embodiment of the invention.

Referring now to the drawing, and FIG. 1 in particular, there is shown a fragmentary, elevational view, partially in section and partially schematic, of encased electrical apparatus, such as a distribution transformer 10. Transformer 10 has an electrical bushing assembly 12 constructed according to a first embodiment of the invention. Transformer 10 comprises a core-coil assembly 11, including primary and secondary windings 14 and 16, respectively, disposed in inductive relation with a magnetic core 18. The core-coil assembly 11 of transformer 10, which is shown schematically, since it does not form a part of the invention, is disposed within a casing or tank 20. Tank 20 contains fluid dielectric means, such as oil, disposed to a predetermined level 22, which surrounds, cools, and insulates the core-coil assembly 11.

Primary and secondary windings 14 and 16 are connected to a source of electrical potential and to a load circuit (not shown), respectively, through electrical insulating bushings disposed through suitable sealed openings in the casing 20, such as through electrical bushing assembly 12 which is connected to terminal 50 of secondary winding 16 via conductor 24. Since the remaining bushings may be constructed in a manner similar to bushing 12, they are not shown in order to simplify the drawing.

Conventional prior art distribution transformer low voltage bushings utilize a porcelain insulator housing, and a costly copper stud which is sized to be insertable through an axial opening in the porcelain insulator. Both ends of the stud are threaded in order to receive means for fastening electrical conductors at each end of the conductor stud. In other words, the encased end of the stud is threaded to receive a washer and a nut for securing the conductor which is connected to the encased electrical apparatus, and the weather end of the stud is threaded to receive a copper alloy connector, which provides a flange for cooperating with a gasket which seals the axial opening in the porcelain insulator housing, and which also cooperates with additional hardware for receiving and securing a line conductor.

Since the electrical connection from the encased end of the bushing to the winding of the transformer is relatively short, and in some cases the connection from the weather end of the bushing to its intended connection point is also relatively short, it would reduce the cost of the apparatus and reduce installation time if the bushing were to be constructed with an insulated, stranded electrical cable which extends therethrough, and outwardly from both the weather and encased ends for a predetermined distance. This construction, however, is not practical with a porcelain bushing, as the stranded cable extending into the oil provides a flow path for the liquid dielectric through the strands of the cable, due to the pressure-siphon effect.

With the present trend to resinous insulating systems for encapsulating electrical apparatus, cast electrical systems have been used to make electrical bushings, in order to reduce their manufacturing cost. The solid conductor stud may be simplified, and a seal is automatically provided as the cast body portion of the bushing adheres tightly to the stud. However, when flexible cables are utilized, the prior art cast bushings utilize a solid connector cast within the bushing to breakup the pressure-siphon path for the liquid dielectric.

FIG. 1 illustrates a new and improved cast bushing structure 12 which utilizes an insulated, stranded electrical cable 30, which makes it unnecessary to dispose a solid connector within the cast bushing. More specifically, bushing 12 comprises an electrical cable 30 having a stranded conductive portion 32, which is formed of a plurality of strands 33 of a good electrical conductor, such as copper or aluminum, and which are twisted to form a rope-like conductor. The conductive portion 32 is surrounded by tightly adhering cable electrical insulation 34, such as polyethylene, or any other suitable electrical insulation. A portion of the insulation 34 is removed from a predetermined section 35 of the stranded conductor 32, with this predetermined section 35 being located within, and embedded in, the insulating or body portion 36 of the bushing.

The body portion 36 of the bushing 12 is formed of a castable electrical insulation system, such as an epoxy resin system. Any one of a large plurality of electrical insulating systems may be used for the cast body portion 36, such as the epoxy system disclosed in copending application Ser. No. 645,319, filed June 12, 1967, which is assigned to the same assignee as the present application.

By removing a portion of the electrical insulation 34 from the stranded electrical conductor 30, and disposing this bared portion of conductor 32 within the casting mold used to form the body portion 36 of bushing 12, the fluid resin system, as it is introduced into the mold, will impregnate the stranded conductor 32, providing a seal about each strand and preventing the pressure-siphon effect from occurring.

The body portion 36 of bushing 12 may be of any suitable configuration, and as shown in FIG. 1 may be generally cylindrical and elongated, with the weather end having a larger diameter than the encased end, to provide a flanged portion 38, and a smaller diameter portion 40. Portion 40 extends into a suitably sized opening 42 in the casing 20, with a gasket member 44 being disposed between the flanged portion 38 and the casing 20 to seal the opening. Any suitable fastening means may be used to secure bushing 12 in assembled relation with casing 20. For example, portion 40 of bushing 12 may have threads 46 molded on its outer surface, which cooperate with a spring grip nut 48. A groove 52 may be disposed in portion 40 of bushing 12, parallel with the axis of cable 30, to provide means for cooperating with a mating projection in the casing, which aligns the bushing and prevents it from rotating once it is inserted into the opening 42 in the casing 20.

The portion of the electrical cable 30 which extends outwardly from the encased end of the bushing 12 should be long enough to allow it to be connected to terminal 50 of secondary winding 16, thus forming electrical lead 24 without the necessity of utilizing an additional conductor. This structure eliminates one fastening step in the connection of each bushing to the secondary winding of the transformer. Further, the insulation of the electrical connections between the bushing and winding is automatically achieved by leaving the insulation 34 on the cable 30 for the necessary distance.

The portion of the electrical cable 30 which extends outwardly from the weather end of the bushing 12 may be long enough to be connected to its intended connection point, and thus may also eliminate the necessity of connecting an additional cable between its intended connection point and the bushing.

Figure 2:
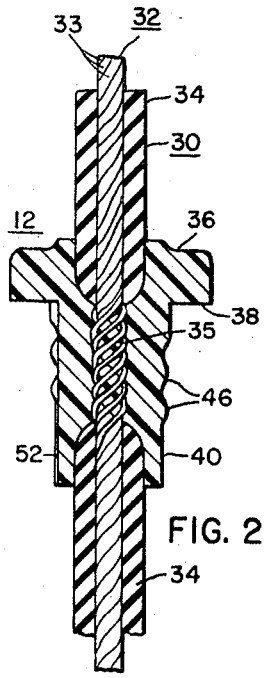
FIG. 2 is an elevational view, partially in section, of an electrical bushing constructed according to another embodiment of the invention.

Complete impregnation of the cable strands 33 in the bared portion 35 of the cable 30 by the resin insulation system is essential to prevent pressure-siphoning of the transformer dielectric. The degree of impregnation depends upon the viscosity of the particular resin system utilized, the sizes of the cable strands, and how tightly the strands are twisted together. In those instances where these factors are such that complete impregnation cannot be assured, the strands of the cable may be separated slightly by applying a circumferential twisting force on both sides of the bared conductor portion 35, twisting in a direction opposite to that which was used when the cable was manufactured. This embodiment of the invention is shown in FIG. 2, where like reference numerals in FIGS. 1 and 2, as well as in the remaining figures, indicate like components. As shown in FIG. 2, the strands of conductive portion 32 have been bent or flared outwardly into a larger diameter than the twisted diameter of conductor 32, which separates the strands from one another in the bared portion 35, thus insuring complete impregnation, even when using very viscous resin systems. Since the reverse twisting of the bared portion of the stranded conductor 32 may be easily and quickly accomplished manually after the insulation 34 has been removed from the specified area, this step may be incorporated into the manufacturing process for all bushings, even when complete impregnation may be achieved without this step, as an additional precaution.

Figure 3:
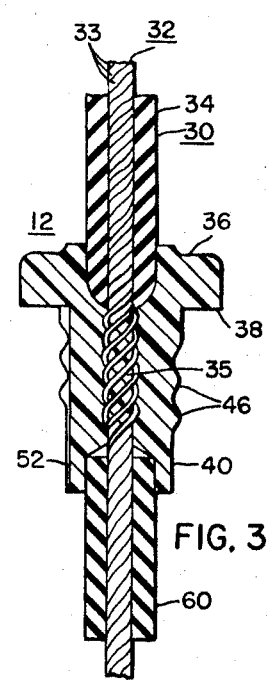
FIG. 3 is an elevational view, partially in section, of an electrical bushing constructed according to still another embodiment of the invention.

In some instances, the cable insulation 34 may not be compatible with the fluid dielectric contained within the casing 12. FIG. 3 illustrates an embodiment of the invention wherein the insulation 34 is completely removed for a predetermined length at one end of the cable 30, with the cable insulation 34 being terminated at the start of the bared conductor area 35. Then, a sleeve 60 of an insulating material which is compatible with the fluid dielectric may be telescoped over the bared end of the cable. The sleeve 60 may be placed in position prior to casting the bushing, thus embedding the sleeve 60 into the body portion 36 of the bushing 12; or, the mold for casing the bushing 12 may contain means for providing a cylindrical recess surrounding the exit of the cable 30 from the encased end of the bushing, into which the end of the sleeve 60 may be inserted after the bushing 12 has been completed.

Figure 4:
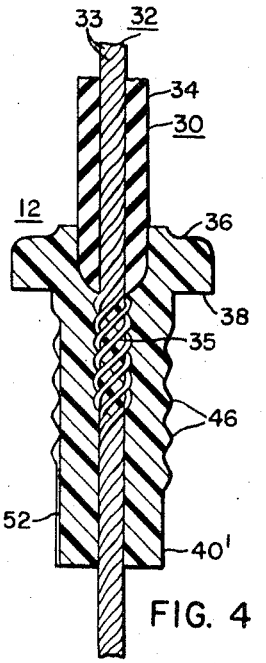
FIG. 4 is an elevational view, partially in section, of an electrical bushing constructed according to another embodiment of the invention.

Since placing a sleeve 60 of a different type of insulation over the bared end of the cable 30 requires an additional manufacturing step, in those instances where it is not desirable for the cable insulation 34 to enter the inside of its associated apparatus, it may be more economical to extend the portion 40 of the bushing 12, to the length necessary to provide the requisite insulation. This embodiment of the invention is shown in FIG. 4, with portion 40 given the reference numeral 40′ in this figure to indicate its changed length dimension compared with the previous embodiment of the invention. In this instance, it will only be necessary to remove the cable insulation 34 from the conductor 32 for a predetermined distance at the end of the cable. The twisted conductor 32 may be flared outwardly at bared portion or section 35, as indicated in FIG. 4, to insure complete impregnation of the cable strands.

Figure 5:
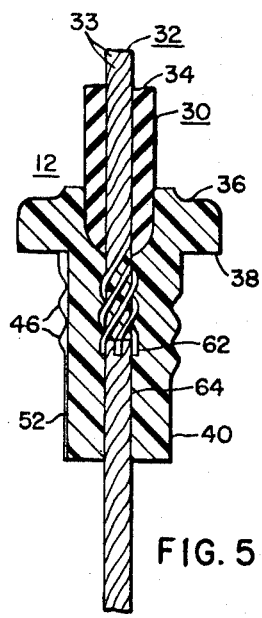
FIG. 5 is an elevational view, partially in section, of an electrical bushing constructed according to another embodiment of the invention.

In the embodiments of the invention shown in FIGS. 3 and 4, it is necessary to strip the cable insulation 34 from a substantial portion of the cable 30. If for some reason this is not desirable, the insulation 34 may be removed from the end of cable 30 for only a short distance, and this bared end connected to a second stranded cable which does not have insulation disposed thereon. This embodiment of the invention is shown in FIG. 5. The strands of the bared end of the cable 30 are flared outwardly as shown at 62, to a diameter which allows a second cable 64 to be inserted into the flared opening at the end of cable 30. The strands 33 of cable 30 may be welded, brazed, soldered, crimped, or otherwise suitably electrically and mechanically connected to the strands of the second cable 64. The flaring of the strands for connection to cable 64 automatically separates the strands from one another, insuring a complete seal about each strand by the solid resinous insulation system, preventing the pressure-siphon effect. The embodiment shown in FIG. 5 may utilize the teachings disclosed in FIG. 3 or 4, wherein a sleeve of insulating material may be telescoped over cable 64, either before or after casting body portion 36; or, the portion 40 of bushing 12 may be elongated to provide the necessary insulation.

In the manufacturing of the bushings disclosed herein, the bushing structure shown in FIG. 1 may be manufactured by the steps of removing a predetermined section of insulation from a stranded electrical cable, placing the cable within a suitable bushing mold, with the bared section of the cable being within the mold, placing the mold and cable within a vacuum chamber, evacuating the vacuum chamber to a predetermined vacuum, introducing a liquid resinous electrical insulation system into the mold, removing the mold from the vacuum chamber, gelling the resin insulation system, removing the mold, and curing the resin system. If the resin system disclosed in the hereinbefore mentioned copending patent application is used, the resin system may be mixed and poured at a temperature of approximately 100° C., into an evacuated chamber which is below a pressure of about 5 millimeters of mercury. The vacuum pouring prevents air inclusions in the casting, and aids the complete impregnation of the bared portion of the stranded conductor. After pouring, the mold may be removed from the vacuum chamber and placed in an oven, where it is heated to temperature of 100 to 120° C. for 1 to 4 hours, with the time depending upon the temperature. This will gel the resin system, after which the mold may be removed and the bushing given a post-cure at a temperature of 150° C. for 4 to 8 hours.

In the embodiment of the invention shown in FIG. 2, the manufacturing process would be the same as described relative to FIG. 1, with the addition of the step of giving the cable a reverse twist to expand and separate the strands of the cable in the portion bared by the removal of the section of insulation.

In the embodiment shown in FIG. 3, the manufacturing process would be the same as described in FIG. 1, with the additional steps of removing the insulation 34 at one end of the cable 30 for a predetermined distance, and telescoping the sleeve 60 over the bared end, either prior to or after the forming of body portion 36 of bushing 12. This embodiment may also include the step of expanding a predetermined portion of the bared strands to insure complete impregnation by the solid resin system.

The embodiment of the invention shown in FIG. 4 may be manufactured as described relative to FIG. 1, with the additional step of removing the insulation 34 from one end of the bushing 12, and using a mold designed to provided adequate electrical insulation without requiring the encased portion of the electrical cable 30 to have additional insulation disposed thereon.

The embodiment of the invention shown in FIG. 5 may be manufactured as described relative to FIG. 1, with the additional step of removing insulation 34 for a short distance from one end of the cable, flaring the strands 33 of the conductor 32 at this end of the cable to form a predetermined opening, and inserting the end of an uninsulated stranded cable 64 into the flared end of the cable, and electrically connecting the two cables.

In summary, there has been disclosed a new and improved electrical bushing structure which utilizes stranded electrical cable as the conductor stud, with the disclosed structure completely eliminating the prior art disadvantage associated with the stranded cable, i.e., the pressure siphoning of the fluid dielectric through the cable strands as the associated electrical apparatus is thermally cycled during its intended use. The disclosed bushings may be manufactured at a substantially lower cost than those of the porcelain type, and possesses the advantage over both the porcelain type and prior art cast type bushings in being able to utilize a stranded cable without the necessity of also utilizing a solid metallic conductor disposed within the bushing to break up the pressure-siphon path.

I claim as my invention:

1. An electrical bushing assembly adaptable for insertion through an opening in the casing of electrical apparatus, comprising:
   a body portion having first and second ends, said body portion being formed of a cast solid insulation system,
   electrical conductor means having first and second ends, including an electrical conductor having a plurality of strands and electrical insulation, said electrical insulation being disposed about a predetermined portion of said electrical conductor, leaving a predetermined bared section thereof, the strands of said electrical conductor being separated from one another for at least a portion of the bared section,
   said electrical conductor means, including the portion of the bared section having the separated strands, being embedded in said body portion, with the solid insulation system of said body portion completely surrounding and adhering to each of the separated strands of the electrical conductor at a common axial location, to seal the conductor and prevent fluid flow therethrough,
   the first and second ends of said electrical conductor means extending outwardly from the first and second ends of said body portion, respectively.

2. The electrical bushing of claim 1 wherein the bared section of the electrical conductor means is completely embedded in said body portion.

3. The electrical bushing of claim 1 wherein the bared section of said electrical conductor means starts within the body portion and continues to the second end of the electrical conductor.

4. The electrical bushing of claim 3 including a sleeve of electrical insulation telescoped over the second end of electrical conductor means, said sleeve extending into the second end of said body portion for a predetermined distance.

5. The electrical bushing of claim 4 wherein said sleeve is bonded to said body portion.

6. An electrical bushing assembly adaptable for insertion through an opening in the casing of electrical apparatus, comprising:
  a body portion having first and second ends, said body portion being formed of a cast solid insulation system,
  electrical conductor means having first and second stranded electrical conductor sections each having first and second ends, at least the first section having electrical insulation disposed thereon starting a predetermined distance from the second end, the second end of said first section having its electrically conductive strands flared outwardly to contact the outer surface of said second stranded conductor section at its first end,
  means electrically connecting the strands of the flared second end of the first stranded conductor section to the first end of said second stranded conductor section,
  said electrically conductor means, including the connected second and first ends of said first and second stranded conductor sections, respectively, being embedded in said body portion, with the cast solid insulating system completely surrounding and adhering to each of the flared strands of said first stranded conductor section, to seal said electrical conductor means and prevent fluid flow therethrough,
  the first and second ends of said first and second stranded conductor sections extending outwardly from the first and second ends of said body portion, respectively.

7. The electrical bushing assembly of claim 6 including a sleeve of electrical insulation telescoped over the second end of the second stranded electrical conductor section, which extends into the second end of said body portion for a predetermined distance.

8. The electrical bushing assembly of claim 7 wherein said sleeve is bonded to said body portion.

References Cited

UNITED STATES PATENTS

| | | | |
|---|---|---|---|
| 1,267,832 | 5/1918 | Wilkinson | 174—23 |
| 2,898,396 | 8/1959 | Watson | 174—23 X |
| 3,348,180 | 10/1967 | Leonard et al. | 174—18 X |

LARAMIE E. ASKIN, Primary Examiner

U.S. Cl. X.R.

174—152